(12) United States Patent
Yasuda

(10) Patent No.: US 7,242,018 B2
(45) Date of Patent: Jul. 10, 2007

(54) METHOD AND APPARATUS FOR ACQUIRING RADIATION IMAGE SIGNALS

(75) Inventor: Hiroaki Yasuda, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1029 days.

(21) Appl. No.: 10/391,272

(22) Filed: Mar. 19, 2003

(65) Prior Publication Data
US 2003/0179415 A1    Sep. 25, 2003

(30) Foreign Application Priority Data
Mar. 22, 2002    (JP)    ............................... 2002-081087

(51) Int. Cl.
*G03B 42/08*    (2006.01)
(52) U.S. Cl. ..................................... 250/584
(58) Field of Classification Search ................ 250/584
See application file for complete search history.

(56) References Cited
U.S. PATENT DOCUMENTS

2001/0032943 A1*  10/2001  Isoda et al. .................. 250/586
2003/0042445 A1*   3/2003  Mitchell et al. ............. 250/584

* cited by examiner

*Primary Examiner*—Constantine Hannaher
(74) *Attorney, Agent, or Firm*—Sughrue Mion, PLLC

(57) ABSTRACT

Stimulating rays containing red light and infrared rays are reflected from a reference plate, which has reflection characteristics to the infrared rays approximately identical with those of a stimulable phosphor sheet, and which is free from characteristics of emitting light when being exposed to the stimulating rays. The stimulating rays reflected from the reference plate are received with a light receiving device via a cut-off filter for transmitting light emitted by the sheet and blocking the red light, and an infrared ray image signal representing the infrared ray components of the stimulating rays is acquired. The infrared ray image signal is subtracted from a radiation image signal representing a radiation image stored on the stimulable phosphor sheet.

12 Claims, 5 Drawing Sheets

METHOD AND APPARATUS FOR ACQUIRING RADIATION IMAGE SIGNALS

BACKGROUND OF THE INVENTION

1. Field of the Invention

This invention relates to a method and apparatus for acquiring a radiation image signal. This invention particularly relates to a method and apparatus for acquiring a radiation image signal, wherein light emitted by a stimulable phosphor sheet, on which a radiation image has been stored, when the stimulable phosphor sheet is exposed to stimulating rays, is received with a light receiving device comprising photodiodes containing silicon as a principal constituent.

2. Description of the Related Art

Radiation image recording and reproducing systems comprising radiation image recording apparatuses, radiation image read-out apparatuses, and the like, in which stimulable phosphors are utilized, have heretofore been known as computed radiography (CR) systems. With the CR systems, a radiation image of an object, such as a human body, is recorded as a latent image on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during exposure of the stimulable phosphor sheet to the radiation. The light emitted by the stimulable phosphor sheet, upon stimulation thereof, is photoelectrically detected and converted into an electric image signal. In this manner, the image signal representing the radiation image of the object is acquired.

As the radiation image read-out apparatuses for the CR systems, there have heretofore been known radiation image read-out apparatuses, wherein red stimulating rays having been produced by a semiconductor laser are irradiated to a stimulable phosphor sheet, on which a radiation image has been stored, light emitted by the stimulable phosphor sheet is detected with a photomultiplier via a stimulating ray cut-off filter for transmitting the light emitted by the stimulable phosphor sheet and blocking the red light, and a radiation image signal representing the radiation image having been stored on the stimulable phosphor sheet is thereby acquired.

Ordinarily, besides the red light, the red stimulating rays produced by the semiconductor laser also contain infrared rays. The red light is filtered out by the stimulating ray cut-off filter, and the infrared rays pass through the stimulating ray cut-off filter. However, the photomultiplier has little sensitivity with respect to the infrared rays. Therefore, in cases where the light, which is emitted by the stimulable phosphor sheet exposed to the red stimulating rays and has wavelengths falling within the visible light wavelength region, is detected with the photomultiplier, the infrared rays contained in the red stimulating rays are not detected.

Recently, there is a strong demand for radiation image read-out apparatuses having a reduced size, and research has been conducted to develop radiation image read-out apparatuses, in which a charge coupled device image sensor (a CCD image sensor) having a small size are utilized in lieu of the photomultiplier, the light emitted by the stimulable phosphor sheet is received with the CCD image sensor, and the radiation image signal representing the radiation image having been stored on the stimulable phosphor sheet is thereby acquired.

The CCD image sensor is the light receiving device comprising photodiodes containing silicon as the principal constituent. The CCD image sensor has a high sensitivity with respect to not only the visible light, but also the infrared rays. Therefore, in cases where the infrared rays contained in the stimulating rays having been produced by the semiconductor laser pass through the stimulating ray cut-off filter and impinge upon the CCD image sensor, the infrared rays are detected and constitute noise in the acquired radiation image signal. Accordingly, it is desired that an infrared ray cut-off filter capable of blocking the infrared rays is inserted to a position between the stimulating ray source and the stimulable phosphor sheet or between the stimulable phosphor sheet and the CCD image sensor, and the infrared rays are thus prevented from being detected.

However, the filter, which is to be inserted to the position between the stimulating ray source and the stimulable phosphor sheet and has sufficient characteristics for transmitting the red light necessary for the stimulation of the stimulable phosphor sheet and blocking the infrared rays, requires a markedly high production cost. Also, the filter, which is to be inserted to the position between the stimulable phosphor sheet and the CCD image sensor and has sufficient characteristics for transmitting the light to be detected and with wavelengths of the visible light wavelength region and for blocking the infrared rays, requires a markedly high production cost. Therefore, the problems occur in that it is not always possible to utilize the aforesaid filter in the radiation image read-out apparatuses.

The problems described above ordinarily occur in cases where the light emitted by the stimulable phosphor sheet is detected with the CCD image sensor and in cases where the light emitted by the stimulable phosphor sheet is detected with the light receiving device comprising the photodiodes containing silicon as the principal constituent.

SUMMARY OF THE INVENTION

The primary object of the present invention is to provide a method of acquiring a radiation image signal, wherein image signal components, which represent infrared rays and have been acquired by being mixed in a radiation image signal representing a radiation image, are capable of being suppressed.

Another object of the present invention is to provide an apparatus for carrying out the method of acquiring a radiation image signal.

The present invention provides a method of acquiring a radiation image signal, comprising the steps of:

i) irradiating stimulating rays, which have been produced by a stimulating ray source and contain red light and infrared rays, to a stimulable phosphor sheet, on which a radiation image has been stored, the stimulating rays causing the stimulable phosphor sheet to emit light in proportion to an amount of energy stored on the stimulable phosphor sheet during exposure of the stimulable phosphor sheet to radiation, and ii) receiving the light, which has been emitted by the stimulable phosphor sheet, with a light receiving device, which comprises photodiodes containing silicon as a principal constituent, via a stimulating ray cut-off filter, which transmits the light emitted by the stimulable phosphor sheet and blocks the red light, the emitted light being subjected to photoelectric conversion performed by the light receiving device, a radiation image signal, which represents the radia tion image stored on the stimulable phosphor sheet, being acquired from the photoelectric conversion, wherein the method further comprises the steps of:

a) reflecting the stimulating rays, which have been produced by the stimulating ray source, from a reference plate, which has reflection characteristics with respect to the infrared rays approximately identical with the reflection characteristics of the stimulable phosphor sheet with respect to the infrared rays, and which is free from characteristics of emitting light when being exposed to the stimulating rays, b) receiving the stimulating rays, which have been reflected from the reference plate, with the light receiving device via the stimulating ray cut-off filter, the reflected stimulating rays being subjected to photoelectric conversion performed by the light receiving device, an infrared ray image signal, which represents the infrared ray components contained in the stimulating rays, being acquired from the photoelectric conversion, and c) subtracting the infrared ray image signal from the radiation image signal, whereby the radiation image signal is corrected.

The present invention also provides an apparatus for acquiring a radiation image signal, comprising:

i) a stimulating ray source for producing stimulating rays, which contain red light and infrared rays, the stimulating rays being irradiated to a stimulable phosphor sheet, on which a radiation image has been stored, and causing the stimulable phosphor sheet to emit light in proportion to an amount of energy stored on the stimulable phosphor sheet during exposure of the stimulable phosphor sheet to radiation, ii) a stimulating ray cut-off filter, which transmits the light emitted by the stimulable phosphor sheet and blocks the red light, and iii) a light receiving device, which comprises photodiodes containing silicon as a principal constituent, the light receiving device receiving the light, which has been emitted by the stimulable phosphor sheet, via the stimulating ray cut-off filter, performing photoelectric conversion of the light, which has been emitted by the stimulable phosphor sheet, in order to acquire a radiation image signal, which represents the radiation image stored on the stimulable phosphor sheet, wherein the apparatus further comprises image signal correcting means for receiving an infrared ray image signal, which represents the infrared ray components contained in the stimulating rays, and subtracting the infrared ray image signal from the radiation image signal in order to correct the radiation image signal, the infrared ray image signal being acquired from an operation for:

a) reflecting the stimulating rays, which have been produced by the stimulating ray source, from a reference plate, which has reflection characteristics with respect to the infrared rays approximately identical with the reflection characteristics of the stimulable phosphor sheet with respect to the infrared rays, and which is free from characteristics of emitting light when being exposed to the stimulating rays, and b) receiving the stimulating rays, which have been reflected from the reference plate, with the light receiving device via the stimulating ray cut-off filter, the reflected stimulating rays being subjected to photoelectric conversion performed by the light receiving device, the infrared ray image signal being acquired from the photoelectric conversion.

The apparatus for acquiring a radiation image signal in accordance with the present invention may be modified such that the apparatus is provided with the reference plate. In such cases, the reference plate may be a stimulable phosphor sheet, on which energy stored during its exposure to radiation has been erased. The term "stimulable phosphor sheet, on which energy has been erased" as used herein means the stimulable phosphor sheet, on which the energy stored during its exposure to the radiation has been erased such that no light is emitted substantially by the stimulable phosphor sheet when the stimulable phosphor sheet is exposed to the stimulating rays.

Also, the apparatus for acquiring a radiation image signal in accordance with the present invention may be modified such that the image signal correcting means is provided with infrared ray image signal storing means for storing the infrared ray image signal, and the correction of the radiation image signal is performed by use of the infrared ray image signal, which has been stored by the infrared ray image signal storing means.

The term "blocking red light" as used herein means that the red light is blocked to an extent such that no adverse effect occurs substantially due to detection of the red light. The blocking of the red light may be performed in one of various ways. For example, the blocking of the red light maybe performed by absorption of the red light or reflection of the red light.

The term "infrared ray components contained in stimulating rays" as used herein means the infrared ray components contained in stimulating rays after passing through the stimulating ray cut-off filter.

With the method and apparatus for acquiring a radiation image signal in accordance with the present invention, wherein the radiation image signal representing the radiation image stored on the stimulable phosphor sheet is acquired, the stimulating rays, which have been produced by the stimulating ray source, are reflected from the reference plate, which has the reflection characteristics with respect to the infrared rays approximately identical with the reflection characteristics of the stimulable phosphor sheet with respect to the infrared rays, and which is free from characteristics of emitting light when being exposed to the stimulating rays. The stimulating rays, which have been reflected from the reference plate, are received with the light receiving device via the stimulating ray cut-off filter. The reflected stimulating rays are subjected to the photoelectric conversion performed by the light receiving device, and the infrared ray image signal, which represents the infrared ray components contained in the stimulating rays, is acquired from the photoelectric conversion. Also, the infrared ray image signal is subtracted from the radiation image signal, and the radiation image signal is thus corrected. Therefore, the image signal components, which represent the infrared rays and have been acquired by being mixed in the radiation image signal representing the radiation image, are capable of being suppressed. Accordingly, a visible image having good image quality is capable of being reproduced from the corrected radiation image signal.

With the apparatus for acquiring a radiation image signal in accordance with the present invention, wherein the apparatus is provided with the reference plate, the operation for acquiring the infrared ray image signal, which represents the infrared ray components contained in the stimulating rays, is capable of being performed easily. With the apparatus for acquiring a radiation image signal in accordance with the present invention, wherein the reference plate is the stimulable phosphor sheet, on which the energy stored during its exposure to the radiation has been erased, the infrared ray image signal for the correction of the radiation image signal is capable of being acquired accurately.

The apparatus for acquiring a radiation image signal in accordance with the present invention may be modified such that the image signal correcting means is provided with the infrared ray image signal storing means for storing the infrared ray image signal, and the correction of the radiation image signal is performed by use of the infrared ray image signal, which has been stored by the infrared ray images signal storing means. With the modification described above, it is not necessary for the operation for acquiring the infrared ray image signal to be performed with respect to all of the operations for acquiring the radiation image signals. Therefore, the correction described above is capable of being performed quickly.

DESCRIPTION OF THE PREFERRED EMBODIMENTS

The present invention will hereinbelow be described in further detail with reference to the accompanying drawings.

Figure 1A:
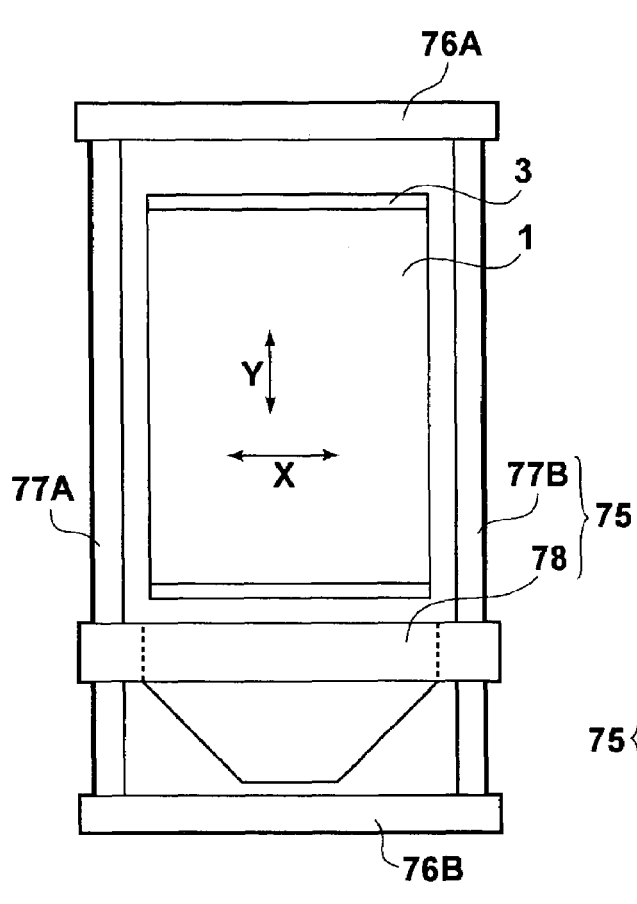
FIG. 1A is a front view showing an embodiment of the apparatus for acquiring a radiation image signal in accordance with the present invention.
Figure 1B:
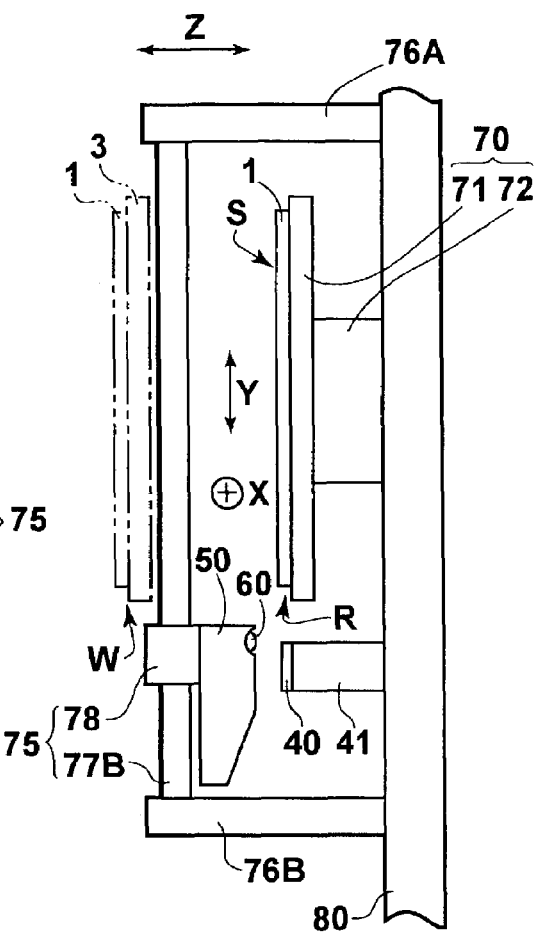
FIG. 1B is a side view showing the embodiment of the apparatus for acquiring a radiation image signal in accordance with the present invention.
Figure 2:
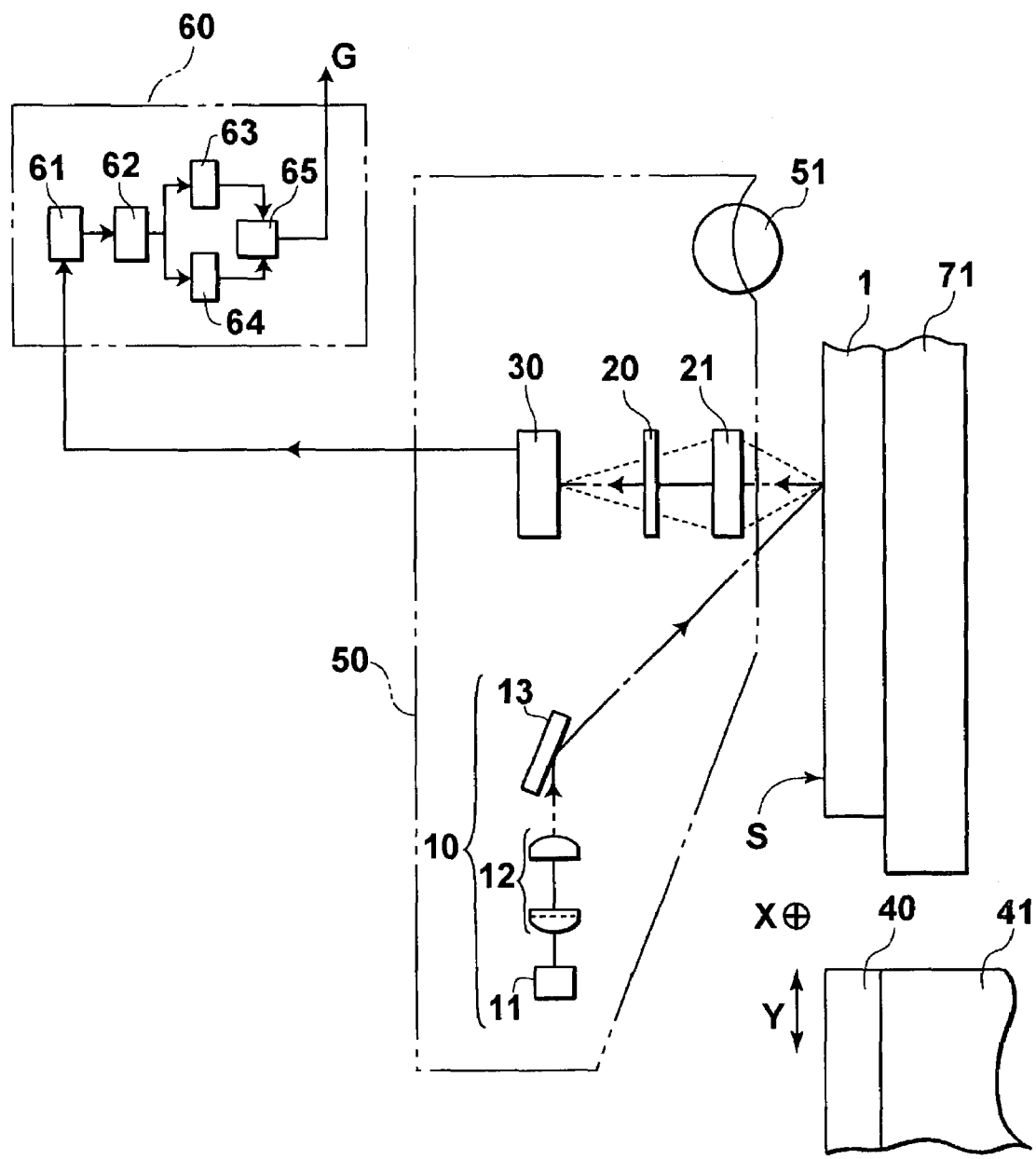
FIG. 2 is an enlarged side sectional view showing an image read-out section.
Figure 4:
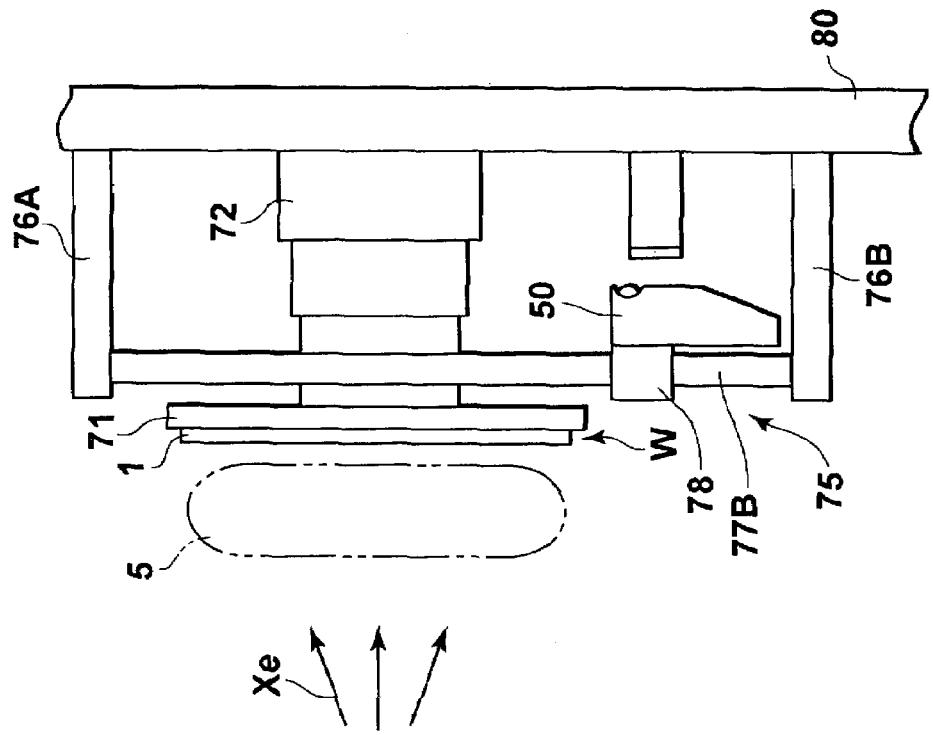
FIG. 4 is a side sectional view showing locations of members at the time of recording of a radiation image of an object on a stimulable phosphor sheet.
Figure 3:
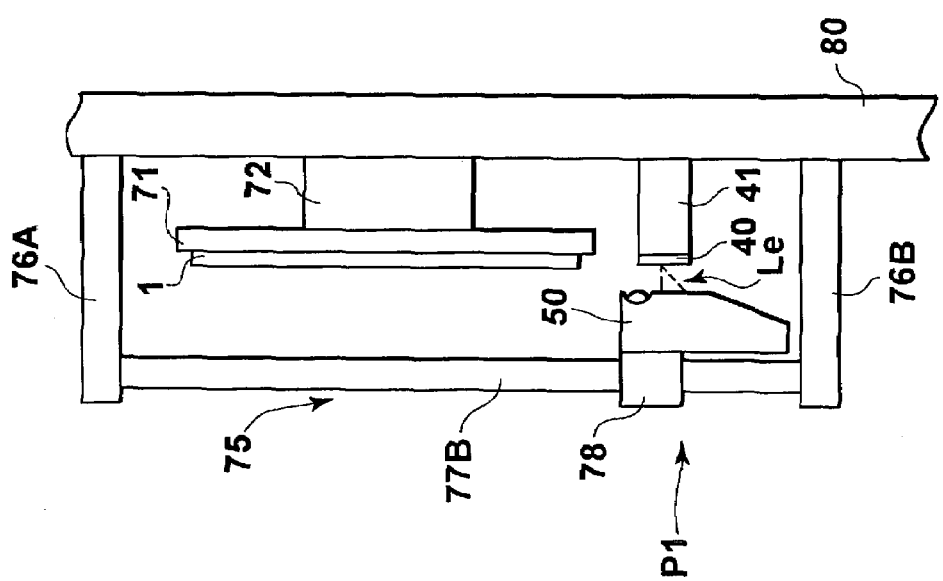
FIG. 3 is a side sectional view showing locations of members at the time of acquisition of an infrared ray image signal.
Figure 5:
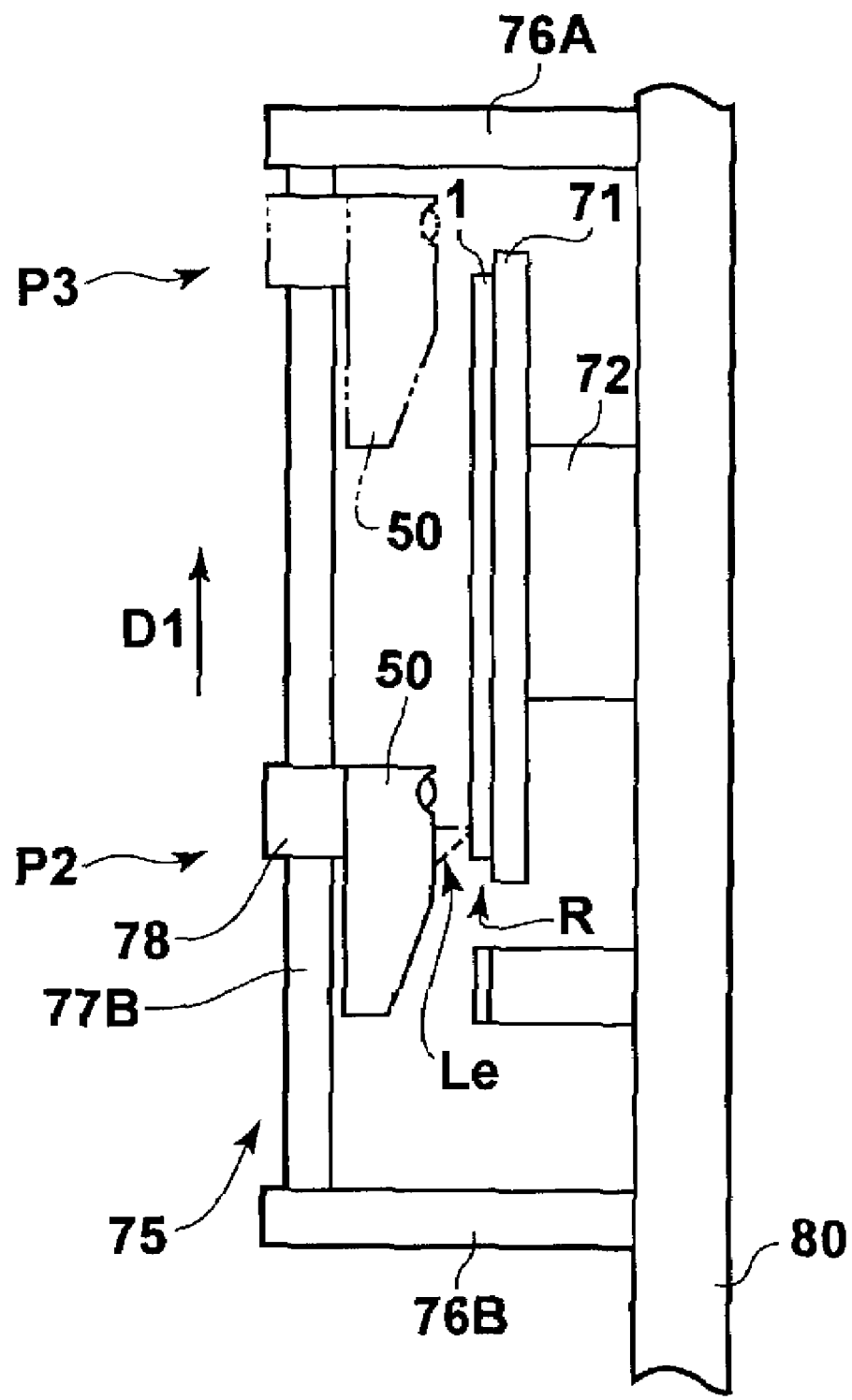
FIG. 5 is a side sectional view showing locations of members at the time of acquisition of a radiation image signal.
Figure 6:
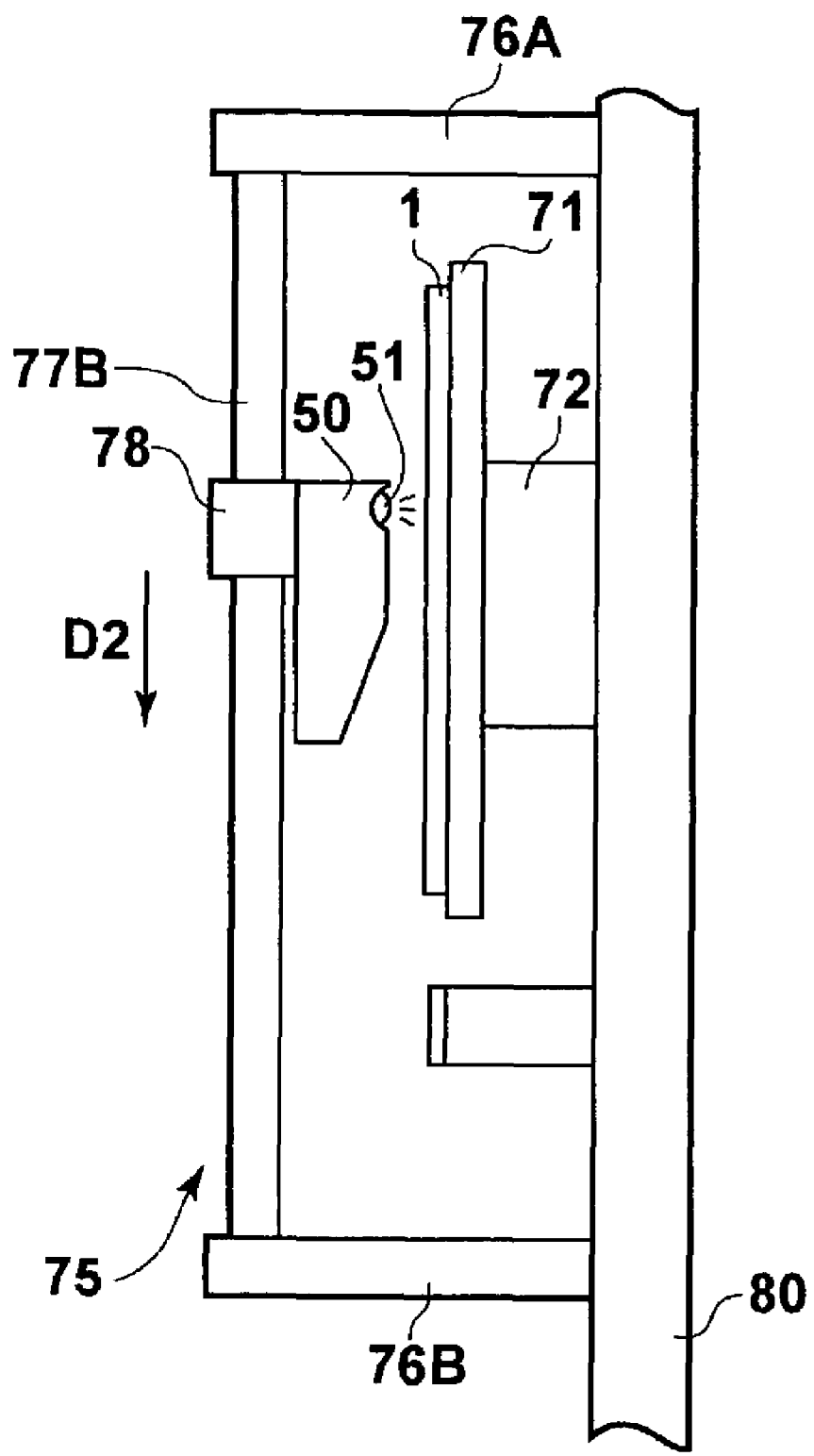
FIG. 6 is a side sectional view showing locations of members at the time of irradiation of erasing light to a stimulable phosphor sheet.

FIG. 1A is a front view showing an embodiment of the apparatus for acquiring a radiation image signal in accordance with the present invention. FIG. 1B is a side view showing the embodiment of the apparatus for acquiring a radiation image signal in accordance with the present invention. FIG. 2 is an enlarged side sectional view showing an image read-out section. FIG. 3 is a side sectional view showing locations of members at the time of acquisition of an infrared ray image signal. FIG. 4 is a side sectional view showing locations of members at the time of recording of a radiation image of an object on a stimulable phosphor sheet. FIG. 5 is a side sectional view showing locations of members at the time of acquisition of a radiation image signal. FIG. 6 is a side sectional view showing locations of members at the time of irradiation of erasing light to a stimulable phosphor sheet.

As illustrated in FIGS. 1A, 1B and FIG. 2, the radiation image signal acquiring apparatus in accordance with the present invention comprises an image read-out section 50. The image read-out section 50 comprises a stimulating ray source 10 for producing stimulating rays, which contain red light and infrared rays. The stimulating rays are irradiated to a stimulable phosphor sheet 1, on which a radiation image has been stored. The stimulating rays cause the stimulable phosphor sheet 1 to emit light in proportion to the amount of energy stored on the stimulable phosphor sheet 1 during exposure of the stimulable phosphor sheet 1 to radiation. The image read-out section 50 also comprises a stimulating ray cut-off filter 20, which transmits the light emitted by the stimulable phosphor sheet 1 and blocks the red light. The image read-out section 50 further comprises a line sensor 30 acting as a light receiving device, which comprises photodiodes containing silicon as a principal constituent. The line sensor 30 receives the light, which has been emitted by the stimulable phosphor sheet 1, via the stimulating ray cut-off filter 20, and performs photoelectric conversion of the light, which has been emitted by the stimulable phosphor sheet 1, in order to acquire a radiation image signal, which represents the radiation image stored on the stimulable phosphor sheet. The line sensor 30 is constituted of a CCD image sensor comprising a plurality of the photodiodes arrayed linearly.

The radiation image signal acquiring apparatus also comprises a reference plate 40, which has reflection characteristics with respect to the infrared rays approximately identical with the reflection characteristics of the stimulable phosphor sheet 1 with respect to the infrared rays, and which is free from characteristics of emitting light when being exposed to the stimulating rays. The radiation image signal acquiring apparatus further comprises image signal correcting means 60 for receiving an infrared ray image signal, which represents the infrared ray components contained in the stimulating rays, and subtracting the infrared ray image signal from the radiation image signal in order to correct the radiation image signal. The infrared ray image signal is acquired from an operation for reflecting the stimulating rays, which have been produced by the stimulating ray source 10, from the reference plate 40, and receiving the stimulating rays, which have been reflected from the reference plate 40, with the line sensor 30 via the stimulating ray cut-off filter 20. The reflected stimulating rays are subjected to the photoelectric conversion performed by the line sensor 30, and the infrared ray image signal is acquired from the photoelectric conversion.

The stimulating ray source 10 comprises a broad area laser 11 for producing linear stimulating rays. The stimulating ray source 10 also comprises an optical system 12, which is constituted of a toric lens, and the like. The optical system 12 converges the stimulating rays, which have been produced by the broad area laser 11, via a reflecting mirror 13, which will be described later, into a linear beam extending in a main scanning direction on the stimulable phosphor sheet 1. (The main scanning direction is the X direction normal to the plane of the sheet of FIG. 2 and will hereinbelow be referred to as the main scanning X direction.) The stimulating ray source 10 further comprises the reflecting mirror 13 for reflecting the linear stimulating rays, which come from the optical system 12, and thereby altering the direction of the optical path of the stimulating rays.

The stimulating ray source 10, the stimulating ray cut-off filter 20, and the line sensor 30 are combined together within the image read-out section 50. Besides the stimulating ray source 10, the stimulating ray cut-off filter 20, and the line sensor 30, the image read-out section 50 also comprises an image forming lens 21 for forming an image of the light, which has been emitted from a linear region of the stimulable phosphor sheet 1 exposed to the stimulating rays, on the line sensor 30 via the stimulating ray cut-off filter 20. The image read-out section 50 further comprises an erasing fluorescent lamp 51, which extends in the main scanning X direction and produces erasing light for erasing energy remaining on the stimulable phosphor sheet 1 after the radiation image signal has been detected from the stimulable phosphor sheet 1. The image forming lens 21 comprises a plurality of image forming lenses arrayed in the main scanning X direction.

The image signal correcting means 60 comprises an analog-to-digital converter 61 for converting the image signals from analog signals to digital signals. The image signal correcting means 60 also comprises an image buffer storage 62 for temporarily storing the digital image signals having been obtained from the analog-to-digital converter 61. The image signal correcting means 60 further comprises an infrared ray image memory 63 for storing the infrared ray image signal, which has been received from the image buffer storage 62. The image signal correcting means 60 still further comprises a radiation image memory 64 for storing the radiation image signal, which has been received from the image buffer storage 62. The image signal correcting means 60 also comprises a correcting operation processing section 65 for receiving the infrared ray image signal from the infrared ray image memory 63, receiving the radiation image signal from the radiation image memory 64, and subtracting the infrared ray image signal from the radiation image signal in order to correct the radiation image signal and to acquire a corrected image signal.

The radiation image signal acquiring apparatus also comprises a sheet support base moving means 70. The sheet support base moving means 70 is provided with a sheet support base 71, which has rigidity and supports the stimulable phosphor sheet 1 such that the orientation of the stimulable phosphor sheet 1 becomes approximately vertical. The sheet support base moving means 70 is also provided with a cylinder expansion and contraction actuating mechanism 72 utilizing pneumatic pressure, hydraulic pressure, or the like. The cylinder expansion and contraction actuating mechanism 72 operates on the side of the sheet support base 71, which side is opposite to the stimulable phosphor sheet 1, in order to move the sheet support base 71 in parallel and along the direction normal to a surface S of the stimulable phosphor sheet 1 (i.e., in the direction indicated by the double headed arrow Z in FIG. 1B). In this manner, the cylinder expansion and contraction actuating mechanism 72 locates the stimulable phosphor sheet 1 at a position W for the recording of the radiation image or at a position R for the readout of the radiation image. The radiation image signal acquiring apparatus further comprises an image read-out section moving means 75 constituting a linear sliding system. The image read-out section moving means 75 is provided with guide rails 77A and 77B, which are secured to rail bases 76A and 76B. The guide rails 77A and 77B extend in the direction indicated by the double headed arrow Y, which direction is normal to the main scanning X direction. (The direction indicated by the double headed arrow Y will hereinbelow be referred to as the sub-scanning Y direction.) Also, the guide rails 77A and 77B are located on opposite sides of the sheet support base 71 with respect to the main scanning X direction such that the guide rails 77A and 77B do not interfere with the parallel movement of the sheet support base 71 performed by the sheet support base moving means 70. Further, the guide rails 77A and 77B are located at the position sandwiched between the position W of the stimulable phosphor sheet 1 for the recording of the radiation image and the position R of the stimulable phosphor sheet 1 for the readout of the radiation image. The image read-out section moving means 75 is also provided with an image read-out section moving base 78, which supports the image read-out section 50 and is engaged with the guide rails 77A and 77B. The image read-out section moving base 78 is moved in the sub-scanning Y direction and on the guide rails 77A and 77B by driving means (not shown) utilizing ball screws, wires, or the like.

The rail bases 76A and 76B, the sheet support base moving means 70, and a reference plate base 41, on which the reference plate 40 is located, are secured to an apparatus base 80.

How the aforesaid embodiment of the apparatus for acquiring a radiation image signal in accordance with the present invention operates will be described hereinbelow.

Firstly, the infrared rays contained in the stimulating rays are detected, and the infrared ray image signal is acquired in the manner described below. Specifically, as illustrated in FIG. 3, the image read-out section 50 is moved by the image read-out section moving means 75 to a position P1 for the detection of the infrared rays, at which position the stimulating rays having been reflected from the reference plate 40 are detected. At the position P1 for the detection of the infrared rays, stimulating rays Le, which have been radiated out from the stimulating ray source 10 and contain the red light and the infrared rays, are reflected from the reference plate 40. The stimulating rays Le, which have been reflected from the reference plate 40, are received with the line sensor 30 via the stimulating ray cut-off filter 20 and subjected to the photoelectric conversion performed by the line sensor 30. In this manner, the infrared ray image signal representing the infrared ray components contained in the stimulating rays Le is acquired. The infrared ray image signal, which has thus been acquired and represents the intensity of the infrared rays having been reflected from the reference plate 40 and corresponding to one line along the main scanning X direction, is processed by the analog-to-digital converter 61 and the image buffer storage 62 and is stored by the infrared ray image memory 63.

Thereafter, as illustrated in FIG. 4, the sheet support base 71, on which the stimulable phosphor sheet 1 has been supported, is moved by the sheet support base moving means 70 in the direction heading away from the apparatus base 80, and the stimulable phosphor sheet 1 is located at the position W for the recording of the radiation image. At the position W for the recording of the radiation image, radiation Xe is irradiated to an object 5, and the radiation Xe carrying image information of the object 5 impinges upon the stimulable phosphor sheet 1. In this manner, the radiation image of the object 5 is stored on the stimulable phosphor sheet 1.

As illustrated in FIG. 5, after the operation for recording the radiation image on the stimulable phosphor sheet 1 has been finished in the manner described above, the sheet support base 71 is moved by the sheet support base moving means 70 in the direction heading toward the apparatus base 80, and the stimulable phosphor sheet 1 is located at the position R for the readout of the radiation image. At the position R for the readout of the radiation image, the operation for reading out the radiation image, which has been stored on the stimulable phosphor sheet 1, from the stimulable phosphor sheet 1 is performed in the manner described below. Specifically, the image read-out section 50 is moved by the image read-out section moving means 75 and is located at a position P2 for the start of the image readout on the stimulable phosphor sheet 1. Thereafter, the image read-out section 50 is moved by the image read-out section moving means 75 in the forward direction heading from the position P2 for the start of the image readout toward the rail base 76A (i.e., in the direction indicated by the arrow D1 in FIG. 5). While the image read-out section 50 is being moved in the forward direction, the light, which is emitted by the stimulable phosphor sheet 1 when the stimulable phosphor sheet 1 is exposed to the linear stimulating rays Le having been radiated out from the stimulating ray source 10, is received by the line sensor 30 via the stimulating ray cut-off filter 20 and subjected to the photoelectric conversion performed by the line sensor 30. In this manner, the radiation image signal, which represents the two-dimensional radiation image stored on the stimulable phosphor sheet 1, is acquired.

The radiation image signal representing the radiation image is processed by the analog-to-digital converter 61 and the image buffer storage 62, and image signal components of the radiation image signal, which image signal components correspond to each of main scanning lines along the main scanning X direction, are successively stored by the radiation image memory 64. When the image read-out section 50 has been moved to a position P3 of the end of the forward movement, the operation for reading out the radiation image, which has been stored on the stimulable phosphor sheet 1, from the stimulable phosphor sheet 1 is finished.

Thereafter, the radiation image signal having been stored by the radiation image memory 64 and the infrared ray image signal having been stored by the infrared ray image memory 63 are fed into the correcting operation processing section 65. The correcting operation processing section 65 subtracts the infrared ray image signal from the radiation image signal in order to correct the radiation image signal and acquires a corrected image signal G. Specifically, the infrared ray image signal, which represents the intensity of the infrared rays having been reflected from the reference plate 40 and corresponding to one line along the main scanning X direction, and which has been stored by the infrared ray image memory 63, is subtracted from the image signal components of the radiation image signal, which image signal components correspond to each of the main scanning lines along the main scanning X direction, and which have been stored by the radiation image memory 64. In this manner, the corrected image signal G described above is acquired. Therefore, the image signal components, which represent the infrared rays and have been acquired by being mixed in the radiation image signal representing the radiation image, are capable of being suppressed.

Thereafter, as illustrated in FIG. 6, the image read-out section 50, which is located at the position P3 of the end of the forward movement, is moved by the image read-out section moving means 75 in the backward direction heading from the rail base 76A to the rail base 76B. While the image read-out section 50 is being thus moved, the erasing fluorescent lamp 51 located on the image read-out section 50 is actuated to produce the erasing light, and the erasing light is irradiated to the stimulable phosphor sheet 1. By the irradiation of the erasing light, energy remaining on the stimulable phosphor sheet 1 is erased. The erased stimulable phosphor sheet 1 is then capable of being utilized again for the recording of a radiation image.

In the embodiment described above, the operation for receiving the stimulating rays Le, which have been reflected from the reference plate 40, and acquiring the infrared ray image signal, which represents the infrared ray components contained in the stimulating rays Le, is performed before the operation for recording the radiation image of the object 5 on the stimulable phosphor sheet 1. Alternatively, the operation for receiving the stimulating rays Le, which have been reflected from the reference plate 40, and acquiring the infrared ray image signal, which represents the infrared ray components contained in the stimulating rays Le, may be performed after the operation for reading out the radiation image from the stimulable phosphor sheet 1 and the operation for erasing the energy remaining on the stimulable phosphor sheet 1 have been finished.

Also, in the embodiment described above, the reference plate 40 is utilized as the reference plate for the acquisition of the infrared ray image signal. Alternatively, a stimulable phosphor sheet, on which the remaining energy has been erased, may be utilized as the reference plate for the acquisition of the infrared ray image signal.

As another alternative, as the reference plate, the stimulable phosphor sheet 1, which has been used in the radiation image signal acquiring apparatus, i.e. the stimulable phosphor sheet 1, from which the radiation image signal has been detected and on which the remaining energy has been erased, maybe utilized. In such cases, the radiation image signal acquiring apparatus need not be provided with a particular reference plate.

The infrared ray image signal to be used for the correction of the radiation image signal need not necessarily be acquired at the time of every operation for detecting the light emitted by a stimulable phosphor sheet. Specifically, the infrared ray image signal may be kept in the state in which the infrared ray image signal is stored by the infrared ray image memory 63. Also, when the correction of an acquired radiation image signal is to be made, the infrared ray image signal may be retrieved from the infrared ray image memory 63 and utilized for the correction of the acquired radiation image signal. In this manner, the corrected image signal G may be acquired. In cases where the technique for the correction described above is employed, the radiation image signal acquiring apparatus need not necessarily be provided with the reference plate. At the time of maintenance work for the radiation image signal acquiring apparatus, or the like, the reference plate may be located within the radiation image signal acquiring apparatus, and the infrared ray image signal, which is to be stored by the infrared ray image memory 63, may be calibrated.

In the operation for acquiring the image signal with the image read-out section 50, a dark signal, which is a signal outputted from the line sensor 30 when the line sensor 30 does not receive any light, may be acquired by being contained in the infrared ray image signal and the radiation image signal. In such cases, with the correcting operation described above, the dark signal is capable of being subtracted together with the infrared ray image signal from the radiation image signal. The dark signal fluctuates largely in accordance with the temperature of the light receiving device. Therefore, in the cases of the modification described above, wherein the infrared ray image signal is kept in the state in which the infrared ray image signal is stored by the infrared ray image memory 63, the corrected image signal G may be acquired in the manner described below. Specifically, the infrared ray image signal is acquired, and the output obtained from the line sensor 30 in the state, in which the stimulating rays Le are not irradiated to the stimulable phosphor sheet 1, is detected as the dark signal. Also, the dark signal is subtracted from the infrared ray image signal, and a processed infrared ray image signal having thus been obtained is stored by the infrared ray image memory 63. Thereafter, at the time of every operation for acquiring a radiation image signal, the dark signal is detected, and the thus detected dark signal and the processed infrared ray image signal having been stored in the radiation image signal acquiring apparatus are subtracted from the radiation image signal. In this manner, the corrected image signal G is acquired. In cases where the corrected image signal G is acquired in this manner, the adverse effects of the dark signal, which fluctuates in accordance with the temperature of the light receiving device, are capable of being suppressed.

Also, in the embodiment described above, the CCD image sensor is employed as the light receiving device. Alternatively, as the light receiving device, one of various other light receiving devices, which comprise photodiodes containing silicon as the principal constituent, i.e. which have sensitivity with respect to the infrared rays, may be employed. In such cases, the same effects as those described above are capable of being obtained. Specifically, besides the CCD solid-state image sensor described above, a light receiving device constituted of a CMOS solid-state image sensor, VMIS solid-state image sensor, or the like, may be employed in the embodiment described above. In such cases, the same effects as those described above are capable of being obtained.

Further, in cases where the light emitted by the stimulable phosphor sheet 1 is detected, an infrared ray attenuating filter, which is capable of attenuating the infrared ray components and is capable of being furnished at a comparatively low cost, should preferably be located at a position in the optical path, which extends from the stimulating ray source 10 for the irradiation of the stimulating rays to the light receiving device for receiving the light emitted by the stimulable phosphor sheet 1 when the stimulable phosphor sheet 1 is exposed to the stimulating rays, and along which the stimulating rays or the light emitted by the stimulable phosphor sheet 1 travels. For example, the infrared ray attenuating filter should preferably be located at a position in the optical path on the side downstream from the position at which the red light is blocked. With the infrared ray attenuating filter, the infrared rays cannot always be blocked to an extent such that no adverse effect occurs substantially due to detection of the infrared rays. However, in cases where the infrared ray attenuating filter is utilized, the absolute value of the intensity of the infrared rays constituting noise is capable of being reduced to a small value. Therefore, in cases where the infrared ray attenuating filter is utilized, and the light emitted by the stimulable phosphor sheet 1 is detected, a signal-to-noise ratio of the radiation image signal is capable of being enhanced.

What is claimed is:

1. A method of acquiring a radiation image signal, comprising the steps of:
   i) irradiating stimulating rays, which have been produced by a stimulating ray source and contain red light and infrared rays, to a stimulable phosphor sheet, on which a radiation image has been stored, the stimulating rays causing the stimulable phosphor sheet to emit light in proportion to an amount of energy stored on the stimulable phosphor sheet during exposure of the stimulable phosphor sheet to radiation, and
   ii) receiving the light, which has been emitted by the stimulable phosphor sheet, with a light receiving device, which comprises photodiodes containing silicon as a principal constituent, via a stimulating ray cut-off filter, which transmits the light emitted by the stimulable phosphor sheet and blocks the red light, the emitted light being subjected to photoelectric conversion performed by the light receiving device, a radiation image signal, which represents the radiation image stored on the stimulable phosphor sheet, being acquired from the photoelectric conversion, wherein the method further comprises the steps of:
   a) reflecting the stimulating rays, which have been produced by the stimulating ray source, from a reference plate, which has reflection characteristics with respect to the infrared rays approximately identical with the reflection characteristics of the stimulable phosphor sheet with respect to the infrared rays, and which is free from characteristics of emitting light when being exposed to the stimulating rays,
   b) receiving the stimulating rays, which have been reflected from the reference plate, with the light receiving device via the stimulating ray cut-off filter, the reflected stimulating rays being subjected to photoelectric conversion performed by the light receiving device, an infrared ray image signal, which represents the infrared ray components contained in the stimulating rays, being acquired from the photoelectric conversion, and
   c) subtracting the infrared ray image signal from the radiation image signal, whereby the radiation image signal is corrected.

2. An apparatus for acquiring a radiation image signal, comprising:
   i) a stimulating ray source for producing stimulating rays, which contain red light and infrared rays, the stimulating rays being irradiated to a stimulable phosphor sheet, on which a radiation image has been stored, and causing the stimulable phosphor sheet to emit light in proportion to an amount of energy stored on the stimulable phosphor sheet during exposure of the stimulable phosphor sheet to radiation,
   ii) a stimulating ray cut-off filter, which transmits the light emitted by the stimulable phosphor sheet and blocks the red light, and
   iii) a light receiving device, which comprises photodiodes containing silicon as a principal constituent, the light receiving device receiving the light, which has been emitted by the stimulable phosphor sheet, via the stimulating ray cut-off filter, performing photoelectric conversion of the light, which has been emitted by the stimulable phosphor sheet, in order to acquire a radiation image signal, which represents the radiation image stored on the stimulable phosphor sheet, wherein the apparatus further comprises image signal correcting means for receiving an infrared ray image signal, which represents the infrared ray components contained in the stimulating rays, and subtracting the infrared ray image signal from the radiation image signal in order to correct the radiation image signal, the infrared ray image signal being acquired from an operation for:
   a) reflecting the stimulating rays, which have been produced by the stimulating ray source, from a reference plate, which has reflection characteristics with respect to the infrared rays approximately identical with the reflection characteristics of the stimulable phosphor sheet with respect to the infrared rays, and which is free from characteristics of emitting light when being exposed to the stimulating rays, and
   b) receiving the stimulating rays, which have been reflected from the reference plate, with the light receiving device via the stimulating ray cut-off filter, the reflected stimulating rays being subjected to photoelectric conversion performed by the light receiving device, the infrared ray image signal being acquired from the photoelectric conversion.

3. An apparatus as defined in claim 2 wherein the apparatus is provided with the reference plate.

4. An apparatus as defined in claim 3 wherein the reference plate is a stimulable phosphor sheet, on which energy stored during its exposure to radiation has been erased.

5. An apparatus as defined in claim 4 wherein the image signal correcting means is provided with infrared ray image signal storing means for storing the infrared ray image signal, and the correction of the radiation image signal is performed by use of the infrared ray image signal, which has been stored by the infrared ray image signal storing means.

6. An apparatus as defined in claim 3 wherein the image signal correcting means is provided with infrared ray image signal storing means for storing the infrared ray image signal, and the correction of the radiation image signal is performed by use of the infrared ray image signal, which has been stored by the infrared ray image signal storing means.

7. An apparatus as defined in claim 2 wherein the reference plate is a stimulable phosphor sheet, on which energy stored during its exposure to radiation has been erased.

8. An apparatus as defined in claim 7 wherein the image signal correcting means is provided with infrared ray image signal storing means for storing the infrared ray image signal, and the correction of the radiation image signal is performed by use of the infrared ray image signal, which has been stored by the infrared ray image signal storing means.

9. An apparatus as defined in claim 2 wherein the image signal correcting means is provided with infrared ray image signal storing means for storing the infrared ray image signal, and the correction of the radiation image signal is performed by use of the infrared ray image signal, which has been stored by the infrared ray image signal storing means.

10. An apparatus as defined in claim 2 wherein the stimulating ray source is a laser beam source.

11. An apparatus as defined in claim 2 wherein the light receiving device is a CCD image sensor.

12. An apparatus as defined in claim 2 wherein the light receiving device is a CMOS image sensor.

* * * * *